(12) United States Patent
Esposito et al.

(10) Patent No.: US 9,594,780 B1
(45) Date of Patent: Mar. 14, 2017

(54) DATABASE SYSTEM WITH USER-DIRECTED APPLICATION-SIDE CONTROL OF DATA MOVEMENT AMONG STORAGE TIERS

(71) Applicant: EMC Corporation, Hopkinton, MA (US)

(72) Inventors: Jeffrey D. Esposito, North Kingstown, RI (US); Anne McClure, Larkspur, CO (US)

(73) Assignee: EMC IP Holding Company LLC, Hopkinton, MA (US)

( * ) Notice: Subject to any disclaimer, the term of this patent is extended or adjusted under 35 U.S.C. 154(b) by 167 days.

(21) Appl. No.: 13/930,036

(22) Filed: Jun. 28, 2013

(51) Int. Cl.
*G06F 17/30* (2006.01)

(52) U.S. Cl.
CPC ...... *G06F 17/303* (2013.01); *G06F 17/30073* (2013.01)

(58) Field of Classification Search
CPC .................. G06F 3/0647; G06F 17/30073
See application file for complete search history.

(56) References Cited

U.S. PATENT DOCUMENTS

| | | | |
|---|---|---|---|
| 5,822,780 A * | 10/1998 | Schutzman | 711/165 |
| 9,189,387 B1 * | 11/2015 | Taylor | G06F 12/0246 |
| 2005/0203921 A1 * | 9/2005 | Newman et al. | 707/100 |
| 2013/0173557 A1 * | 7/2013 | Panda | G06Q 10/06 707/667 |
| 2014/0095448 A1 * | 4/2014 | Marwah et al. | 707/667 |
| 2014/0095790 A1 * | 4/2014 | Chambliss et al. | 711/117 |

OTHER PUBLICATIONS

SQL::Translator User Manual. By Ken Y. Clark. As archived on Feb. 14, 2012. Accessed Mar. 31, 2015 at <https://web.archive.org/web/20120214030600/http://search.cpan.org/dist/SQL-Translator/lib/SQL/Translator/Manual.pod>.*
"SQL Views" by W3Schools. Accessed Mar. 30, 2016 from <http://www.w3schools.com/sql/sql_view.asp>.*

* cited by examiner

Primary Examiner — Robert Beausoliel, Jr.
Assistant Examiner — Arthur Ganger
(74) Attorney, Agent, or Firm — Ryan, Mason & Lewis, LLP (57) ABSTRACT

A database system is provided with user-directed application-side storage tiering control functionality. A database node of a database system comprises a daemon to communicate with a plurality of storage devices on a plurality of storage tiers of the database system; the daemon further configured to implement storage tiering control functionality based on a user-specified data selection and tier imperative for at least first and second storage tiers comprising respective disjoint subsets of the plurality of storage tiers. An application executing on the database node provides the user-specified data selection and tier imperative to the daemon for processing in response to a predefined keyword. The daemon performs the storage tiering control functionality in response to a programmatic call comprising one or more predefined keywords, such as predefined base command verbs, tier imperative keywords and/or environmental qualifiers. A shunt robot optionally implements the storage tiering control functionality on the at least first and second storage tiers.

30 Claims, 6 Drawing Sheets

| BASE COMMAND VERB | TIER IMPERATIVE | ENVIRONMENTAL QUALIFIER | CONTEXTUAL ACTION |
|---|---|---|---|
| Scan(top(x)) | PRIORITY | Ora12(cls) | CONTENT SELECTION MOVED TO HIGHEST PERFORMING TIER FOR THAT STORAGE |
| MOD | DEPRIORITY | pgres | PERFORM UPDATE AND MOVE CONTENT TO LOWEST PERFORMING/LEAST EXPENSIVE TIER FOR THAT STORAGE |
| CLEAR | TURBO | mss(cls) | RELEASE DEFINED SUBSET FROM DATA ENVIRONMENT |
| RECO | SHIFT (+/− 1, ALL) | dbtwo | RESTORE TO ORIGINAL TIERING |

CONTROL SCRUBBER

1.0 HASH CHECK FOR INVALID/UNSUPPORTED SYNTAX AGAINST INBOUND REQUEST OBJECT 610
1.1 CONFIRM INBOUND REQUEST DB USER IDENTITY FOR SITAR GRANTS; LOG SECURITY REJECTION OTHERWISE
1.2 SET PARSE COMPLEXITY RATING INTEGER (PCR) BASED ON VENDOR CONTEXT, SITAR VERB PHRASE AND LIMIT DELTA AS FOLLOWS:
PCR = A+B+C, WHERE
A = (DB VENDOR CONTEXT, e.g., ORACLE, SQL SERVER, DB2)
B = (LENGTH OF SITAR VERB PHRASE (COMMAND CONCATENATION))
C = (LIMIT DELTA (LENGTH ACTUAL − LIMIT)

INBOUND REQUEST − 610

| SYNTAX | VENDOR CONTEXT | SQL | LIMIT | PCR | USER IDENTITY |
|---|---|---|---|---|---|

VERB PHRASE PARSER

1.3 EXTRACT AND CHUNK SYNTAX VERB PHRASE INTO TASK ELEMENTS FROM SYNTAX ELEMENT BASED ON B ITERATIVELY
1.3.1 CONFIRM TASK ELEMENTS AND VENDOR CONTEXT AGAINST STORAGE ENVIRONMENT AND PCR RANGE TO OBTAIN DISCRETE STORAGE ACTION (DSA)
1.3.2 AGGREGATE TASK ELEMENTS INTO A SHUNT TASK;
1.3.3 ASSIGN JOB NUMBER TOKEN (JNT)

FIG. 8

STORAGE OPTION SCRUBBER

1.4 CALCULATE AND CATALOG IMPACT WEIGHTING (IW) RISK

1.4.1 CALCULATE IW VALUES FOR SAMPLED, ACTIVE RESOURCES AS FOLLOWS:
IW = (DNU+HCP+DP+ASC+PCR)*STATE,
WHERE
- DNU IS DATA NETWORK UTILIZATION
- HCP IS HOST CPU PROFILE
- DP IS DISK PROFILE BASED ON STORAGE TIER ACTIVITY
- ASC IS ACTIVE SHUNT COUNT

FIG. 9

SHUNT ROBOT

1.5 SET SHUNT SPAWN LIMIT BASED ON ACTIVE IW

1.5.1 SHUNT SPAWN LIMIT (SSL) X WHERE
F(X) = IW +10
... (x>75 {SPAWN = 3} ...

1.5.1.1 SPAWN PROCESS THREADS FOR ENABLED SHUNT TASKS WITHIN SSL 1.5.1.2 LOG DENIED SHUNT TASKS (CALL TO SITAR JOURNALER)

1.5.1.3 CALL STORAGE OPTION SCRUBBER 800 TO RE-EVALUATE DEFERRED SHUNT TASKS

DATABASE SYSTEM WITH USER-DIRECTED APPLICATION-SIDE CONTROL OF DATA MOVEMENT AMONG STORAGE TIERS

FIELD

The field relates generally to data storage, and more particularly, to storage re-tiering in database systems.

BACKGROUND

A database system allows multiple client devices to share access to databases over a network. In conventional database implementations, it can be difficult to balance the conflicting requirements of storage capacity and IO throughput. IO operations on object storage servers are generally performed directly with back-end storage arrays associated with those servers, and the corresponding storage devices may not be well matched to the current needs of the system. This can lead to situations in which either performance is less than optimal or the costs of implementing the system become excessive.

SQL (Structured Query Language) is a programming language that can be used to manage data stored in a relational database management system (RDBMS). The most common operation in SQL is the query, which is performed with a declarative select statement. A SQL query retrieves data from one or more tables or expressions. Tiered storage is a data storage environment consisting of two or more kinds of storage delineated by differences in price, performance, capacity and/or functionality. The performance of a SQL query may be impaired when the target data is stored on multiple storage tiers or when the target data is stored on a storage tier offering a lower performance level.

Accordingly, despite the many advantages of database systems, a need remains for additional improvements, particularly with regard to IO operations. A need exists for user-directed storage tiering control that allows selected data, independent of database or application environment, to be promoted and/or demoted among storage tiers in context of dynamic business data priorities from either inside or outside of application code. For example, further acceleration of IO operations, leading to enhanced system performance relative to conventional arrangements, would be desirable. Additionally or alternatively, an ability to achieve particular levels of performance at lower cost would be advantageous.

SUMMARY

Illustrative embodiments of the present invention provide database systems that implement user-directed application-side storage tiering control functionality, so as to provide significant improvements relative to conventional arrangements. In one embodiment, a database system comprises at least one database node, comprising: a daemon to communicate with a plurality of storage devices on a plurality of storage tiers of the database system; the daemon further configured to implement storage tiering control functionality based on a user-specified data selection and tier imperative for at least first and second storage tiers comprising respective disjoint subsets of the plurality of storage tiers, the daemon thereby being configured to control movement of data between the at least first and second storage tiers.

According to one aspect of the invention, an application executing on the database node provides the user-specified data selection and tier imperative to the daemon for processing in response to a predefined keyword. According to another aspect of the invention, the daemon performs the storage tiering control functionality in response to a programmatic call comprising one or more predefined keywords. The predefined keywords include, for example, predefined base command verbs to define the user-specified data selection; tier imperative keywords to define the tier imperative; and/or environmental qualifiers to define an environment of the database system.

According to yet another aspect of the invention, the daemon comprises a shunt robot to implement the storage tiering control functionality on the at least first and second storage tiers. The exemplary shunt robot optionally spawns one or more storage realignment activity threads. In various embodiments, the daemon further comprises a lexical parser to perform lexical parsing in context using one or more predefined keywords; a control scrubber to evaluate one or more of a syntax validity and security; and/or a storage option scrubber to evaluate one or more of a profile and risks of one or more of the database host and storage resources.

As noted above, illustrative embodiments described herein provide significant improvements relative to conventional arrangements. In some of these embodiments, use of a user-directed application-side storage tiering control function allows dynamic balancing of storage capacity and IO throughput requirements in a database system, thereby allowing particular levels of performance to be achieved at a significantly lower cost than would otherwise be possible.

DETAILED DESCRIPTION

Illustrative embodiments of the present invention will be described herein with reference to exemplary database systems and associated clients, servers, storage arrays and other processing devices. It is to be appreciated, however, that the invention is not restricted to use with the particular illustrative database system and device configurations shown. Accordingly, the term "database system" as used herein is intended to be broadly construed, so as to encompass, for example, dedicated standalone and/or distributed or parallel database systems, and other types of database systems implemented using one or more clusters of processing devices.

Aspects of the present invention provide user-directed storage tiering control that allows selected data to be promoted and/or demoted among storage tiers. In one exemplary embodiment, a SQL Intercept Tier Alignment Robot (SITAR) daemon is provided on one or more nodes of a database system. The SITAR daemon allows a user to specify a subset of a database (e.g., a selected data range and/or segments of data within data file blocks) to be promoted and/or demoted among a plurality of storage tiers. The data selection can be performed across a plurality of tiers, which may be, for example, partitioned by date, and the selected data can be directed to a designated tier.

According to a further feature of the invention, storage tiering control can be provided from within or outside of a database application to re-tier SQL objects at a selected level. Storage tiering is initiated from within a database application by employing a recognized verb keyword that provides an indication to the database application to provide the following syntax to the SITAR daemon 250 as a pass-through for further processing. In this manner, the disclosed exemplary SITAR daemon provides intelligent and real-time movement of tables, table spaces and user-specified data selections among storage tiers in applications interacting with SQL compliant databases. While the present invention is implemented using SQL queries, other query languages could be employed as would be apparent to a person of ordinary skill in the art.

As discussed hereinafter, in one exemplary embodiment, the disclosed SITAR daemon is a rule-based mechanism to move user-specified data selections across storage tiers in real-time. The exemplary SITAR daemon processes user actions initiated from within or outside of a database application to validate, weight, prioritize, and aggregate action task elements in context of an active resource burden and encapsulated best practices for storage tiering. Once validated, parsed, and indexed, the SITAR daemon spawns, monitors and journals storage realignment activity threads based on those and other operational criteria as detailed in the lexical parse engine schematic.

Figure 1:
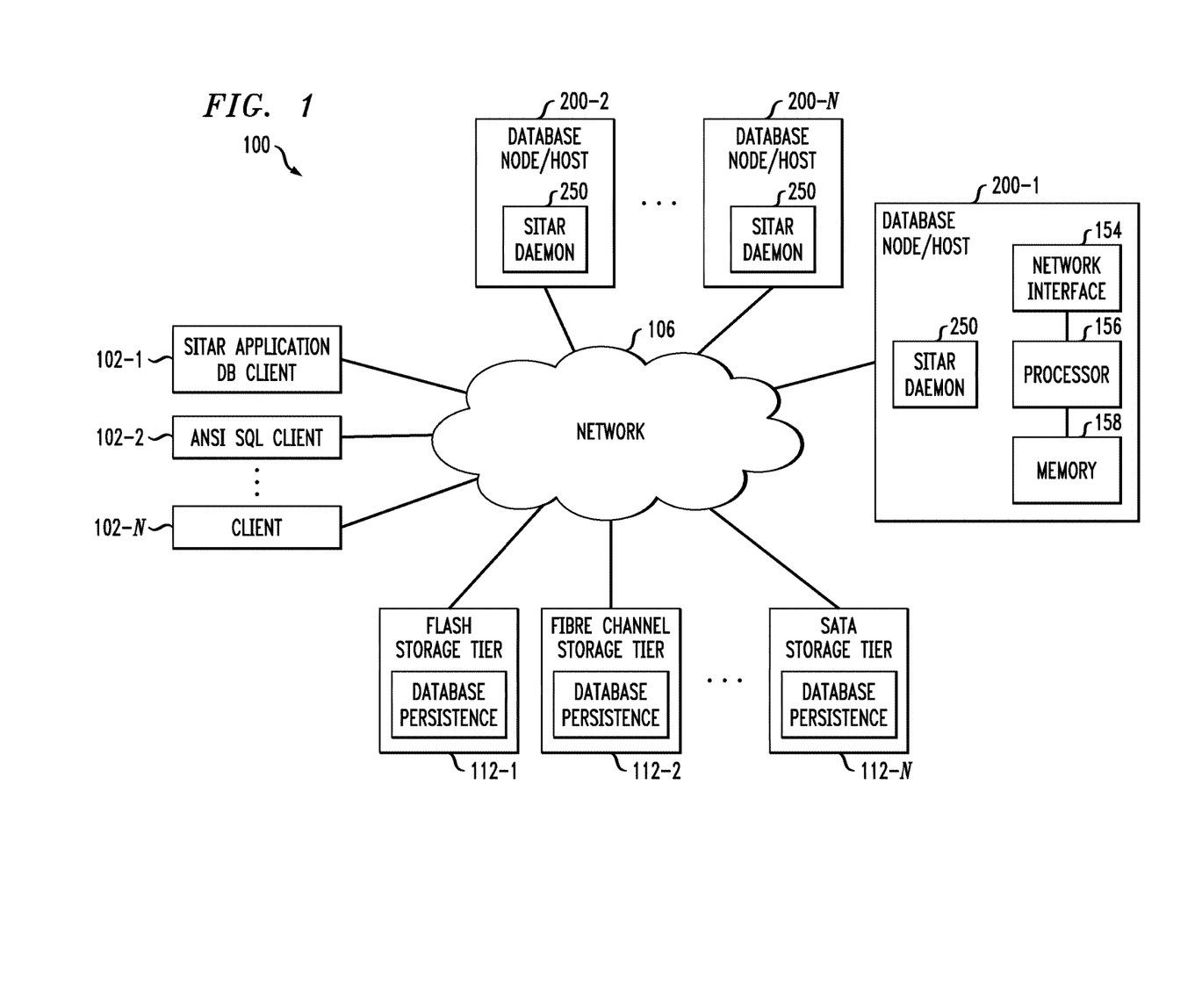
FIG. 1 is a block diagram of a database system having multiple storage tiers and a SQL Intercept Tier Alignment Robot (SITAR) daemon in an illustrative embodiment of the invention.

FIG. 1 shows a database system 100 configured in accordance with an illustrative embodiment of the present invention. The database system 100 comprises a plurality of clients 102, one or more database nodes 200-1 through 200-N, as discussed further below in conjunction with FIG. 2, and a plurality of storage tiers 112-1 through 112-N. More particularly, the exemplary database system 100 comprises N clients denoted 102-1, 102-N, and N storage tiers denoted 112-1 through 112-N which may comprise a storage array or other type of storage device. The clients 102 communicate with the database nodes 200 over a network 106.

Storage arrays utilized in the database system 100 may comprise, for example, storage products such as VNX and Symmetrix VMAX, both commercially available from EMC Corporation of Hopkinton, Mass. A variety of other storage products may be utilized to implement at least a portion of the object storage targets of the database system 100.

The network 106 may comprise, for example, a global computer network such as the Internet, a wide area network (WAN), a local area network (LAN), a satellite network, a telephone or cable network, a cellular network, a wireless network such as WiFi or WiMAX, or various portions or combinations of these and other types of networks. The term "network" as used herein is therefore intended to be broadly construed, so as to encompass a wide variety of different network arrangements, including combinations of multiple networks possibly of different types.

The storage tiers 112 in the present embodiment are arranged into first, second and third storage tiers 112-1 and 112-2, also denoted as Storage Tiers 1, 2 and 3, although it is to be appreciated that less than or more than three storage tiers may be used in other embodiments. The first, second and third storage tiers 112 comprise respective disjoint subsets of storage. More particularly, the first storage tier 112-1 comprises flash storage, the second storage tier 112-2 comprises fibre channel storage and the third storage tier 112-N comprises SATA storage. As shown in FIG. 1, each storage tier maintains database persistence.

As discussed further below in conjunction with FIGS. 4 and 5, the exemplary clients 102 comprise a SITAR application database client 102-1 and an ANSI SQL client 102-2. The client 102 may also be referred to herein as simply a "user." The term "user" should be understood to encompass, by way of example and without limitation, a user device, a person utilizing or otherwise associated with the device, a software client executing on a user device or a combination thereof. An operation described herein as being performed by a user may therefore, for example, be performed by a user device, a person utilizing or otherwise associated with the device, a software client or by a combination thereof.

The different storage tiers 112-1 through 112-N in this embodiment comprise different types of storage devices having different performance characteristics. As indicated above, the first storage tier 112-1 provides storage of a first type, such as flash storage, the second storage tier 112-2 provides storage of a second type, such as fibre channel storage, and the third storage tier 112-N provides storage of a third type, such as SATA (Serial ATA) storage.

The flash storage devices of the first storage tier 112-1 are generally significantly faster in terms of read and write access times than the fibre channel storage devices of the second storage tier 112-2. The flash storage devices are therefore considered "fast" devices in this embodiment relative to the "slower" fibre channel storage devices. Likewise, the fibre channel storage devices of the second storage tier 112-2 are generally significantly faster in terms of read and write access times than the SATA disk storage devices of the third storage tier 112-N. The fibre channel storage devices are therefore considered "faster" devices in this embodiment relative to the "slower" disk channel storage devices.

Accordingly, the database system 100 may be characterized in the present embodiment as having a "fast" storage tier 112-1, a "medium" storage tier 112-2, and a "slow" storage tier 112-N, where "fast," "medium" and "slow" in this context are relative terms and not intended to denote any particular absolute performance level. These storage tiers 112 comprise respective disjoint subsets of storage devices. However, numerous alternative tiering arrangements may be used, including more or less tiers each providing a different level of performance. The particular storage devices used in a given storage tier may be varied in other embodiments and multiple distinct storage device types may be used within a single storage tier.

The flash storage devices in the first storage tier 112-1 may be implemented, by way of example, using respective flash Peripheral Component Interconnect Express (PCIe) cards or other types of memory cards installed in a computer or other processing device that implements the corresponding storage tier 112-1. Numerous alternative arrangements are possible. Also, a variety of other types of non-volatile or volatile memory in any combination may be used to implement at least a portion of the storage devices. Examples of alternatives to flash storage devices that may be used in other embodiments of the invention include non-volatile memories such as magnetic random access memory (MRAM) and phase change random access memory (PC-RAM).

The flash storage devices of the first storage tier 112-1 generally provide higher performance than the disk storage devices of the third tier 112-N but the disk storage devices of the third storage tier 112-N generally provide higher capacity at lower cost than the flash storage devices. The exemplary tiering arrangement of FIG. 1 therefore makes it possible to dynamically balance the conflicting requirements of storage capacity and IO throughput, thereby avoiding situations in which either performance is less than optimal or the costs of implementing the system become excessive. Arrangements of this type can provide further acceleration of IO operations in the database system 100, leading to enhanced system performance relative to conventional arrangements, while additionally or alternatively providing an ability to achieve particular levels of performance at lower cost.

In the FIG. 1 embodiment, user-directed application-side storage tiering control functionality is implemented in each database node 200 using a SITAR daemon 250, as discussed further below in conjunction with FIG. 2. More particularly, in the embodiment of FIG. 1, the database nodes 200 comprise a SITAR daemon 250 configured to implement storage tiering control functionality for the storage tiers 112 which as noted above comprise respective disjoint subsets of storage devices. The SITAR daemon 250 is thereby configured to control movement of data between the storage devices of the exemplary first, second and third storage tiers 112-1 through 112-N. Examples of such movement will be described below.

Each database node 200 further comprises a processor 156 coupled to a memory 158. The processor 156 may comprise a microprocessor, a microcontroller, an application-specific integrated circuit (ASIC), a field-programmable gate array (FPGA) or other type of processing circuitry, as well as portions or combinations of such circuitry elements. The memory 158 may comprise random access memory (RAM), read-only memory (ROM) or other types of memory, in any combination.

The memory 158 and other memories disclosed herein may be viewed as examples of what are more generally referred to as "computer program products" storing executable computer program code.

Also included in the database node 200 is network interface circuitry 154. The network interface circuitry 154 allows the database nodes 200 to communicate over the network 106 with the clients 102 and storage tiers 112. The network interface circuitry 154 may comprise, for example, one or more conventional transceivers.

The SITAR daemon 250 of the database nodes 200 may be implemented at least in part in the form of software that is stored in memory 158 and executed by processor 156.

The database node 200 comprising processor, memory and network interface components as described above is an example of what is more generally referred to herein as a "processing device." Each of the clients 102, storage tiers 112 and database nodes 200 may similarly be implemented as a processing device comprising processor, memory and network interface components.

Although multiple SITAR daemon 250 are shown in the FIG. 1 embodiment, a given database system 100 in other embodiments may comprise only a single SITAR daemon 250.

The database system 100 may be implemented, by way of example, in the form of an ORACLE™ network file system (NFS), although use of any particular database system is not a requirement of the present invention. Accordingly, database nodes 200 need not be configured with ORACLE™ functionality, but may instead represent elements of another type of database system.

As indicated previously, it is difficult in conventional database system implementations to balance the conflicting requirements of storage capacity and IO throughput. This can lead to situations in which either performance is less than optimal or the costs of implementing the system become excessive.

In the present embodiment, these and other drawbacks of conventional arrangements are addressed by providing a SITAR daemon 250 to implement storage tiering control functionality. As will be described, such arrangements advantageously allow for transparent storage re-tiering in a database system in a manner that avoids the need for any significant changes to clients and storage devices of storage tiers 112. Again, other types and configurations of multiple storage tiers and associated storage devices may be used. Exemplary features of the data migration software and other functionality associated with a SITAR daemon 250 will be described below.

It should be noted with regard to the illustrative embodiments of FIG. 1 that relatively minor modifications may be made to one or more applications or other system elements or components in order to achieve additional improvements. For example, a job scheduler or other similar component within the system 100 can also be modified so as to take full advantage of the available storage tiering functionality.

Figure 2:
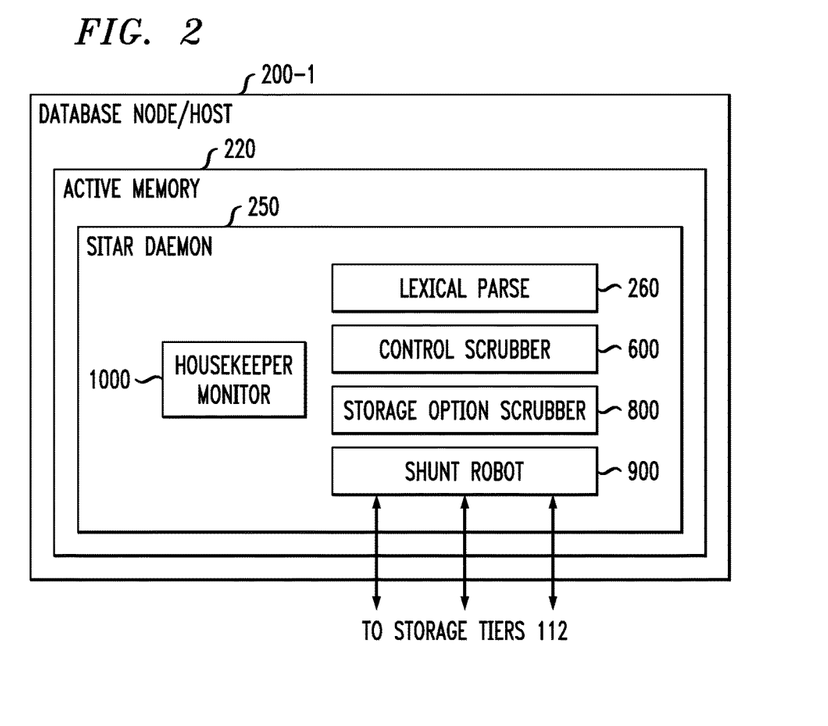
FIG. 2 is a block diagram of an exemplary embodiment of a SITAR daemon executing on a database node of FIG. 1.

FIG. 2 is a block diagram of an exemplary embodiment of SITAR daemon 250 executing on a database node 200 of FIG. 1 that incorporates aspects of the present invention. The exemplary SITAR daemon 250 executes in the active memory 220 of a database node 200 to perform storage re-tiering using storage alignment operations based on recognized verb phrases, as discussed further below in conjunction with FIGS. 3-5, database vendor context, and optionally a factored parse complexity rating (PCR).

As shown in FIG. 2, an exemplary SITAR daemon 250 comprises a lexical parse layer 260, a control scrubber 600, a storage option scrubber 800, a shunt robot 900 and a housekeeper monitor 1000. Generally, as discussed further below in conjunction with FIGS. 3-5, the lexical parse layer 260 comprises a verb phrase parser function 700 (not shown in FIG. 2), as discussed further below in conjunction with FIG. 7, to perform lexical parsing in context using predefined keywords. The exemplary verb phrase parser 700 correlates task elements against discrete storage actions, optionally aggregating into a work entry.

As discussed further below in conjunction with FIG. 6, the exemplary control scrubber 600 prevents and/or corrects improper syntax, performs security/validity handling and optionally sets a parse complexity rating that can optionally be used to perform work thread metering. As discussed further below in conjunction with FIG. 8, the exemplary storage option scrubber 800 performs a profile/risk check of the host and storage resources, optionally resolving to an indexed task state assignment (Enabled, Deferred, Denied).

As discussed further below in conjunction with FIG. 9, the exemplary shunt robot 900 implements storage re-tiering on the storage tiers 112 by spawning storage realignment activity threads based on the assigned State, Impact Weight (IW) and Discrete Storage Action (DSA). As discussed further below in conjunction with FIG. 10, the exemplary housekeeper monitor 1000 performs monitoring and metering of shunt tasks, SITAR daemons, and SITAR performance statistics and metrics.

Figure 3:
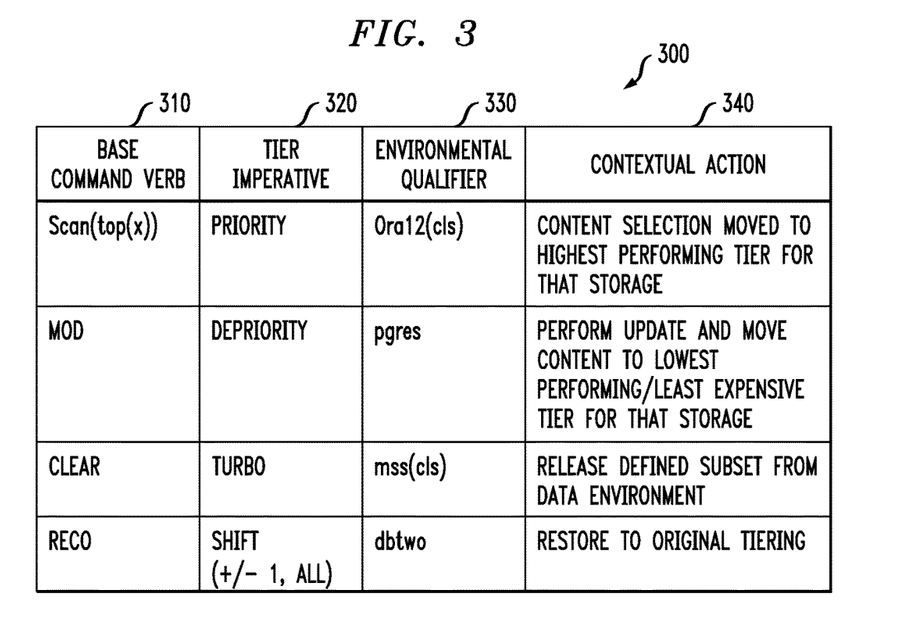
FIG. 3 is a table illustrating an exemplary set of command verbs, tier imperatives and environmental qualifiers and the resulting contextual action.

FIG. 3 is a table illustrating an exemplary set of command verbs 310, tier imperatives 320 and environmental qualifiers 330 and the resulting contextual action 340. As shown in column 310 of FIG. 3, an exemplary embodiment of SITAR provides a scan base command verb to select content (e.g., in the Top N rows), a modify (mod) base command verb to perform an update, a clear base command verb to release the defined data subset and a recover base command verb to restore to original tiering.

As shown in column 320 of FIG. 3, an exemplary embodiment of SITAR provides a priority tier imperative to indicate that selected data should be moved to the highest performing storage tier, a depriority tier imperative to indicate that selected data should be moved to the lowest performing (e.g., least expensive) storage tier, a turbo tier imperative to indicate that selected data should be acted upon immediately and a shift tier imperative to indicate that selected data should be shifted up or down one level in the storage tiers 112.

As shown in column 330 of FIG. 3, an exemplary embodiment of SITAR provides a number of exemplary environmental qualifiers to indicate database-vendor specific information so that SITAR takes correct action, where ora12(cls) indicates an ORACLE™ Real Application Cluster (RAC) cluster, pgres indicates postgres (database vendor), mss(cls) indicates a MICROSOFT™ SQL Server cluster, and dbtwo indicates an IBM™ DB2™ relational database management system.

It is noted that other combinations of command verbs 310, tier imperatives 320 and environmental qualifiers 330 can be employed than those combinations showed in FIG. 3, as would be apparent to a person of ordinary skill in the art.

Figure 4:
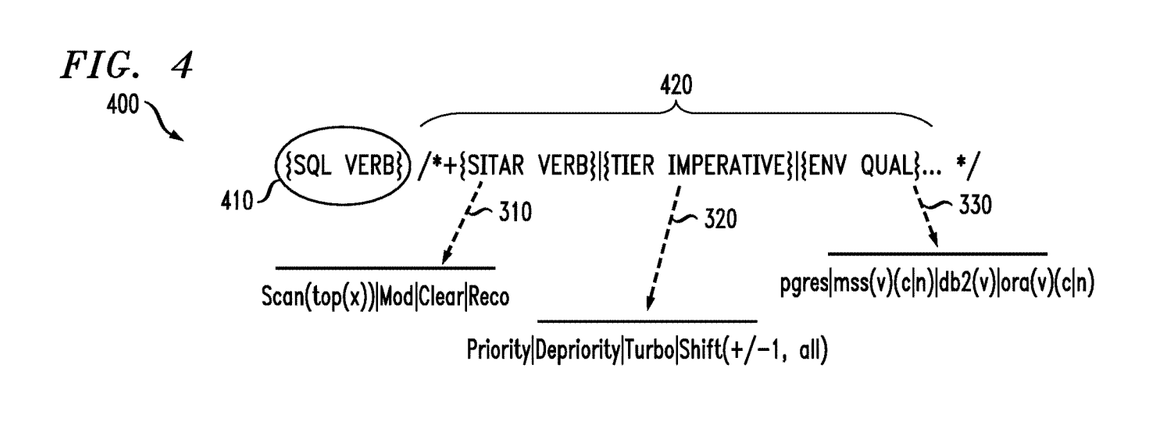
FIGS. 4 and 5 illustrate exemplary programmatic calls to implement storage re-tiering in accordance with aspects of the invention.

FIG. 4 illustrates an exemplary programmatic call 400 to SITAR via an exemplary ANSI SQL pass through "hint". The exemplary programmatic call 400 comprises a predefined SQL verb keyword 410 providing an indication to the database application that the following SITAR string 420 should be provided to (pass through to) the SITAR daemon 250 for processing. The SITAR string 420 is comprised of one command verb 310, one tier imperative 320 and one environmental qualifier 330, where v indicates version and c|n indicates a cluster, node.

Figure 5:
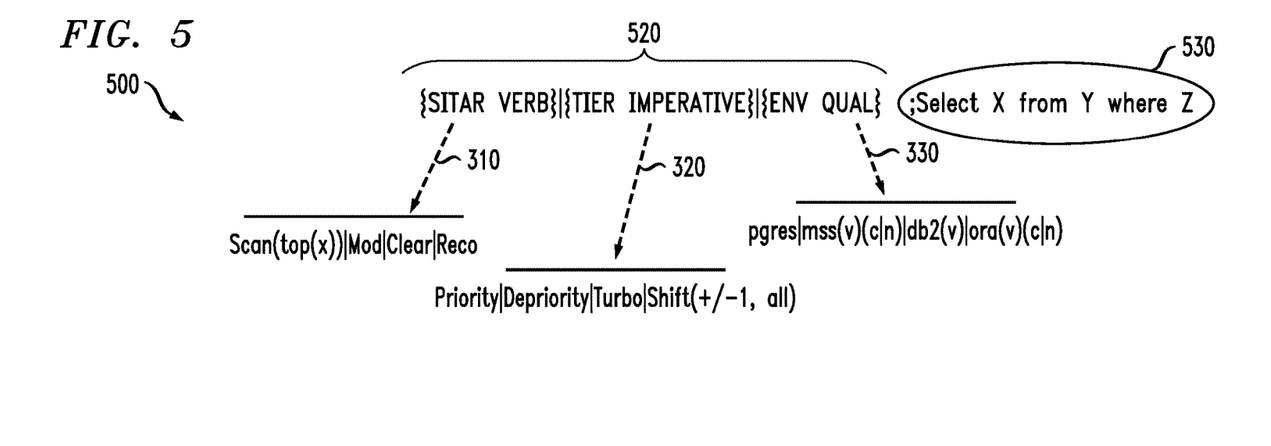

FIG. 5 illustrates an exemplary programmatic call 500 to SITAR from outside of a database application with an exemplary ANSI SQL query issued as a client connection. The exemplary programmatic call 500 comprises a SITAR string 520 to be processed by the SITAR daemon 250. For example, the programmatic call 500 may comprise a select statement 530 to select identified data from a given location.

For example, a programmatic call 400 within an application may comprise:
Select /* {Scan(top(500)) Priority Oral 1(cls)} */ cus.c_name,cus.c_ord,cus.c_due,ord.order summary from customers cus, orders ord where cus.c_id=ord.c_id;

Based on the scan command verb 310 and priority tier imperative 320, this exemplary programmatic call 500 shifts the data selection from the top 500 records from the current storage tier into a tablespace based in the highest performing storage tier of an ORACLE™ database system.

In another example, a programmatic call 500 from outside an application may comprise:
{Mod Depriority dbtwo(node)}; Update orders, set order_state='complete' where order_type='backlog'

Based on the modify select verb 310 and depriority tier imperative 320, this exemplary programmatic call 500 performs the update command for backlog orders, changes the state to complete and then moves the selected content to the lowest performing/least expensive storage tier in an IBM™ DB2™ node environment. The application is a scheduled batch job firing outside of the database, as a client of the database environment. Thus, the batch job should not consume resources needed by higher priority tasks.

Examples of operations that may be performed in the system 100 utilizing the SITAR daemon 250 for all calls to SITAR in active memory will now be described in more detail with reference to the pseudo code of FIGS. 6-11.

Figure 6:
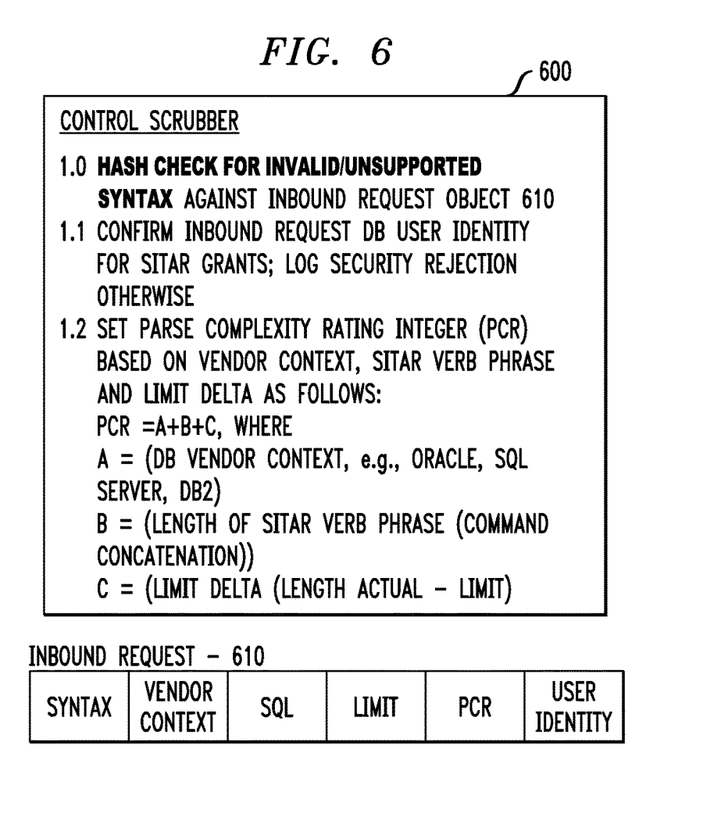
FIGS. 6 through 11 comprise exemplary pseudo code for various components of the SITAR daemon of FIG. 2.

FIG. 6 illustrates exemplary pseudo code 600 for the control scrubber 600 of FIG. 2. As indicated above, the exemplary control scrubber 600 prevents and/or corrects improper syntax, performs security/validity handling and optionally sets a parse complexity rating that can optionally be used to perform work thread metering.

As shown in FIG. 6, the exemplary pseudo code 600 performs a hash check for invalid/unsupported syntax against an inbound request object 610 during step 1.0. During step 1.1, the control scrubber 600 confirms the database user identity associated with the inbound request 610 for Sitar Grants. A security rejection can be logged if the user identity is unauthorized.

During step 1.2, the control scrubbers 600 sets a Parse Complexity Rating (PCR), for example, based on a Vendor context, Sitar verb phrase and limit delta as follows:

$PCR = A + B + C$, where,

A=(database Vendor Context, e.g., ORACLE™ database system, SQL Server, DB2);
B=(Length of Sitar verb phrase 310 (command concatenation)); and
C=(Limit Delta (Actual Length−Limit specified in request 610).

Figure 7:
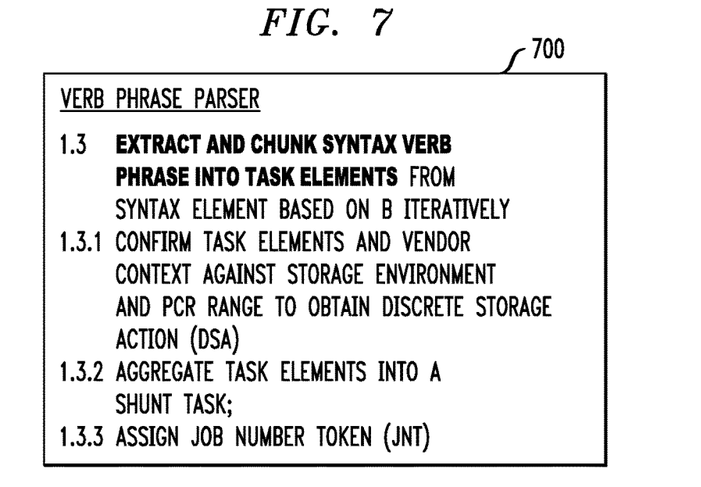

FIG. 7 illustrates exemplary pseudo code 700 for a verb phrase parser. As indicated above, the verb phrase parser 700 performs lexical parsing in context using predefined keywords. As shown in FIG. 7, the exemplary pseudo code 700 extracts and chunks syntax verb phrases 310 from programmatic calls into task elements from the Syntax element based on the B parameter (above) iteratively during step 1.3. The verb phrase parser 700 confirms Task Elements and Vendor Context against the Storage Environment and PCR range to obtain a Discrete Storage Action (DSA) during step 1.3.1. The Task Elements are aggregated into a Shunt Task during step 1.3.2.; A job number token (JNT) is assigned during step 1.3.3, for example, based on a PCR and GUID (globally unique identifier) composite.

Figure 8:
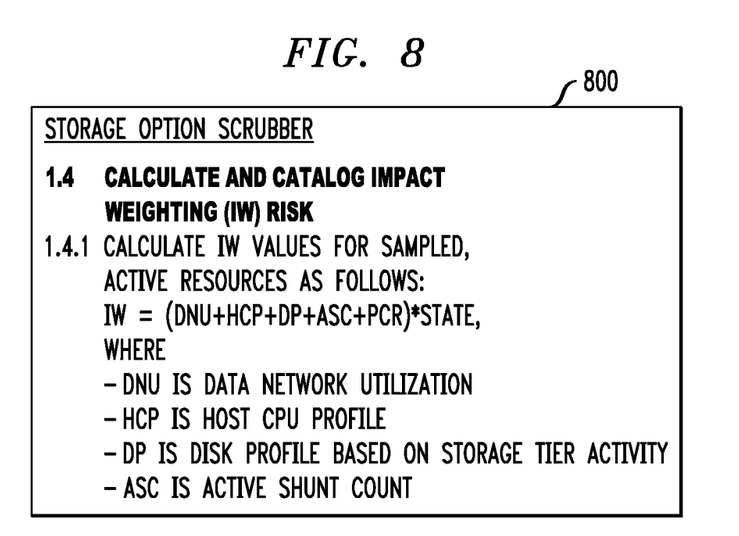

FIG. 8 illustrates exemplary pseudo code 800 for the storage option scrubber 800 of FIG. 2. As indicated above, the exemplary storage option scrubber 800 performs a profile/risk check of the host and storage resources, optionally resolving to an indexed task state assignment (Enabled, Deferred, Denied).

As shown in FIG. 8, the exemplary pseudo code 800 calculates and catalogs an impact weighting (IW) risk during step 1.4. The exemplary IW values for sampled, active resources are calculated during step 1.4.1 as follows:

$IW = (DNU + HCP + DP + ASC + PCR) * State$, where the data network utilization (DNU) may comprise, for example, v$IOStat_Network; the Host CPU profile (HCP) may comprise, for example, v$SGAINFO (size, granule size, free memory), v$SGA_Dynamic; the Disk Profile (DP) based on Storage Tier Activity may comprise, for example, v$sysmetric and an Active Shunt Count (ASC).

Examples of operations that may be performed in the system 100 utilizing the SITAR daemon 250 for all validated, parsed and indexed shunt tasks will now be described in more detail with reference to the pseudo code of FIGS. 9-11.

Figure 9:
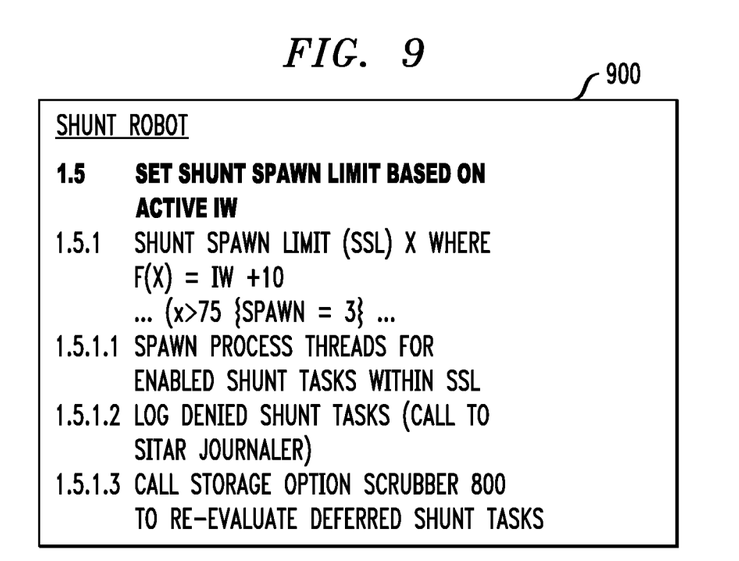

FIG. 9 illustrates exemplary pseudo code 900 for the shunt robot 900 of FIG. 2. As indicated above, the exemplary shunt robot 900 implements storage re-tiering on the storage tiers 112 by spawning storage realignment activity threads based on the assigned State, impact weight (IW) and Discrete Storage Action (DSA).

As shown in FIG. 9, the exemplary pseudo code 900 sets the shunt spawn limit (SSL) pessimistically during step 1.5 based on the active IW. The Shunt Spawn Limit (SSL) X is set during step 1.5.1 where $$F(x)=IW+10$$

$$\ldots (x>75\{\text{spawn}=3\}) \ldots$$

The process threads for enabled shunt tasks within the SSL are spawned during step 1.1.1; the denied shunt tasks are logged during step 1.5.1.2, for example using a call to a journaler 1100 (FIG. 11); and the storage option scrubber 800 is called during step 1.5.1.3 to re-evaluate the deferred shunt tasks.

Figure 10:
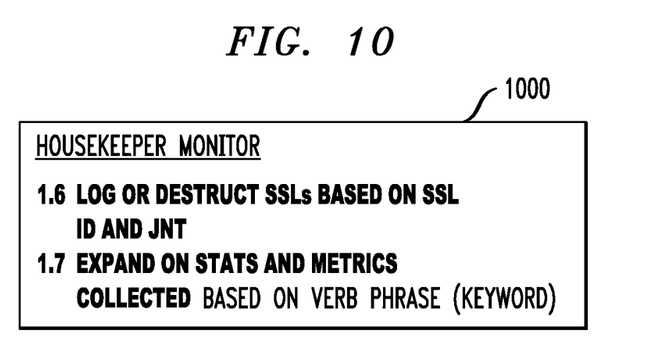

FIG. 10 illustrates exemplary pseudo code 1000 for the housekeeper monitor 1000 of FIG. 2. As indicated above, the exemplary housekeeper monitor 1000 performs monitoring and metering of shunt tasks, SITAR daemons, and SITAR performance statistics and metrics.

As shown in FIG. 10, the exemplary pseudo code 1000 logs or destructs SSLs during step 1.6 based on SSL ID and JNT. The housekeeper monitor 1000 expands on statistics and metrics collected based on Verb Phrase (keyword) during step 1.7.

Figure 11:
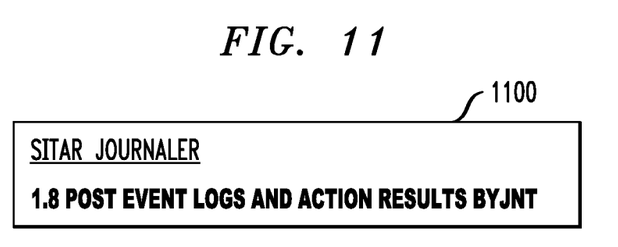

FIG. 11 illustrates exemplary pseudo code 1100 for a SITAR journaler 1100 incorporating aspects of the present invention. As shown in FIG. 11, the exemplary pseudo code 1100 posts event logs and action results by JNT during step 1.8.

Among other benefits, the disclosed SITAR daemon 250 can adjust application data performance priorities in context of shifting business data priorities; optimize a configuration for storage resource alignment to those priorities; adapt to performance requirements over time and attain an improved financial return on data storage investment and use. The disclosed SITAR daemon 250 can dynamically realign selected database content at the object or data subset level to a selected storage tiering assignment, independent of database or application environment, and from inside or outside of database application code.

The exemplary SITAR daemon 250 can factor for and address the following data cost/performance challenges and needs:

Timely and controlled response to shifts in data priorities by those directly responsible for business data performance and efficacy.

Storage tier realignment of selected database content via application or interactive SQL query across database vendors and application environments.

Allow database administrators and database application developers to promote or demote selected data subsets in any SQL-compliant database environment, resulting in timely tuning for performance and cost effective business data.

Improve configuration for storage and memory resource alignment to business data priorities within safeguards and policies.

It is to be appreciated that the particular operations and associated messaging illustrated in FIGS. 6-11 are exemplary only and numerous other types of operations and messaging may be used in other embodiments.

It should therefore be understood that in other embodiments different arrangements of additional or alternative elements may be used. At least a subset of these elements may be collectively implemented on a common processing platform or each such element may be implemented on a separate processing platform.

Also, numerous other arrangements of computers, servers, storage devices or other components are possible in the database system 100. Such components can communicate with other elements of the database system 100 over any type of network or other communication media.

As indicated previously, components of a SITAR daemon 250 as disclosed herein can be implemented at least in part in the form of one or more software programs stored in memory and executed by a processor of a processing device. A memory having such program code embodied therein is an example of what is more generally referred to herein as a "computer program product."

The database system 100 or portions thereof may be implemented using one or more processing platforms each comprising a plurality of processing devices. Each such processing device may comprise processor, memory and network interface components of the type illustrated for database node 200-1 in FIG. 1.

As indicated above, database system tiering functionality such as that described in conjunction with FIGS. 2 through 11 can be implemented at least in part in the form of one or more software programs stored in memory and executed by a processor of a processing device such as a computer or server. A memory or other storage device having such program code embodied therein is an example of what is more generally referred to herein as a "computer program product." Certain system components are implemented using a combination of software and hardware.

It should again be emphasized that the above-described embodiments of the invention are presented for purposes of illustration only. Many variations and other alternative embodiments may be used. For example, the disclosed techniques are applicable to a wide variety of other types and arrangements of database systems and associated clients, servers and other processing devices that can benefit from user-directed application-side storage tiering control functionality as described herein. Also, the particular configurations of system and device elements shown in FIG. 1 can be varied in other embodiments. Moreover, the various assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A database node of a database system, comprising:
a daemon to communicate with a plurality of storage devices on a plurality of storage tiers of the database system;
the daemon further configured to implement storage tiering control functionality in response to a command-based user-specified dynamic data selection of at least one database object subset and a tier imperative for at least first and second storage tiers comprising respective disjoint subsets of the plurality of storage tiers, wherein said command-based user-specified dynamic data selection comprises one or more verb phrases to dynamically generate said at least one database object subset from data in an active memory of said database node, wherein said daemon executes in said active memory;

the daemon thereby being configured to dynamically control movement of said at least one dynamically generated database object subset between the at least first and second storage tiers in response to said command-based user-specified dynamic data selection and tier imperative;

the daemon being implemented utilizing at least one processing device coupled to a memory.

2. The database node of claim 1, wherein an application executing on said database node provides said user-specified data selection and tier imperative to the daemon for processing in response to a predefined keyword.

3. The database node of claim 1, wherein said daemon performs said storage tiering control functionality in response to a programmatic call comprising one or more predefined keywords.

4. The database node of claim 3, wherein said one or more predefined keywords comprise one or more predefined base command verbs to define said user-specified data selection.

5. The database node of claim 3, wherein said one or more predefined keywords comprise one or more tier imperative keywords to define said tier imperative.

6. The database node of claim 3, wherein said one or more predefined keywords comprise one or more environmental qualifiers to define an environment of said database system.

7. The database node of claim 1, wherein the daemon is further configured to communicate with one or more clients over a network and to process requests from said clients.

8. The database node of claim 1, wherein the daemon further comprises a shunt robot to implement said storage tiering control functionality on said at least first and second storage tiers.

9. The database node of claim 8, wherein at least a portion of the shunt robot is implemented using data migration software at least a portion of which is stored in said memory and executed by said at least one processing device.

10. The database node of claim 9, wherein the shunt robot spawns one or more storage realignment activity threads.

11. The database node of claim 10, wherein a number of said storage realignment activity threads is determined based on an assessment of one or more of resources in said database system and a complexity of a re-tiering task.

12. The database node of claim 1, wherein the daemon further comprises a lexical parser to perform lexical parsing in context using one or more predefined keywords.

13. The database node of claim 1, wherein the daemon further comprises a control scrubber to evaluate one or more of a syntax validity and security.

14. The database node of claim 1, wherein the daemon further comprises a storage option scrubber to evaluate one or more of a profile and risks of one or more of the database host and storage resources.

15. The database node of claim 1, wherein said user-specified tier imperative allows said user to selectively promote and demote said selected at least one database object subset.

16. A processing platform comprising the database node of claim 1.

17. A method comprising:
configuring a daemon on a database node to communicate with a plurality of storage devices on a plurality of storage tiers of a database system; and
further configuring the daemon to implement storage tiering control functionality in response to a command-based user-specified dynamic data selection of at least one database object subset and a tier imperative for at least first and second storage tiers comprising respective disjoint subsets of the plurality of storage tiers based on said user-specified data selection and tier imperative, wherein said command-based user-specified dynamic data selection comprises one or more verb phrases to dynamically generate said at least one database object subset from data in an active memory of said database node, wherein said daemon executes in said active memory;
the daemon thereby being configured to dynamically control movement of said at least one dynamically generated database object subset between the at least first and second storage tiers in response to said command-based user-specified dynamic data selection and tier imperative.

18. The method of claim 17, wherein an application executing on said database node provides said user-specified data selection and tier imperative to the daemon for processing in response to a predefined keyword.

19. The method of claim 17, further comprising the step of configuring the daemon to perform said storage tiering control functionality in response to a programmatic call comprising one or more predefined keywords.

20. The method of claim 19, wherein said one or more predefined keywords comprise one or more of predefined base command verbs to define said user-specified data selection, tier imperative keywords to define said tier imperative and environmental qualifiers to define an environment of said database system.

21. The method of claim 17, wherein the daemon further comprises a shunt robot to implement said storage tiering control functionality on said at least first and second storage tiers.

22. The method of claim 21, further comprising the step of configuring the shunt robot to spawn one or more storage realignment activity threads.

23. The method of claim 17, wherein said user-specified tier imperative allows said user to selectively promote and demote said selected at least one database object subset.

24. A computer program product comprising a non-transitory machine-readable storage medium having encoded therein executable code of one or more software programs, wherein the one or more software programs when executed cause the daemon to perform the steps of the method of claim 17.

25. A database system comprising:
a database node;
a plurality of storage tiers having at least first and second storage tiers comprising respective disjoint subsets of the plurality of storage tiers; and
a daemon on said database node to communicate with a plurality of storage devices on said plurality of storage tiers;
the daemon further configured to implement storage tiering control functionality in response to a command-based user-specified dynamic data selection of at least one database object subset and a tier imperative for said at least first and second storage tiers, wherein said command-based user-specified dynamic data selection comprises one or more verb phrases to dynamically generate said at least one database object subset from data in an active memory of said database node, wherein said daemon executes in said active memory; and
the daemon thereby being configured to dynamically control movement of said at least one dynamically generated database object subset between the at least first and second storage tiers in response to said command-based user-specified dynamic data selection and tier imperative.

26. The database system of claim 25, wherein an application executing on said database system provides said user-specified data selection and tier imperative to the daemon for processing in response to a predefined keyword.

27. The database system of claim 25, wherein said daemon performs said storage tiering control functionality in response to a programmatic call comprising one or more predefined keywords.

28. The database system of claim 27, wherein said one or more predefined keywords comprise one or more of predefined base command verbs to define said user-specified data selection, tier imperative keywords to define said tier imperative and environmental qualifiers to define an environment of said database system.

29. The database system of claim 25, wherein the daemon further comprises a shunt robot to implement said storage tiering control functionality on said at least first and second storage tiers.

30. The database system of claim 29, wherein the shunt robot spawns one or more storage realignment activity threads.

* * * * *

UNITED STATES PATENT AND TRADEMARK OFFICE
CERTIFICATE OF CORRECTION

| | | |
|---|---|---|
| PATENT NO. | : 9,594,780 B1 | Page 1 of 1 |
| APPLICATION NO. | : 13/930036 | |
| DATED | : March 14, 2017 | |
| INVENTOR(S) | : Esposito et al. | |

It is certified that error appears in the above-identified patent and that said Letters Patent is hereby corrected as shown below:

In the Specification

Column 5, Lines 19 and 20, replace "storage tiers 112 which as noted" with --storage tiers 112, which as noted--.

Column 8, Line 18, replace "control scrubbers 600" with --control scrubber 600--.

Signed and Sealed this
Second Day of May, 2017

Michelle K. Lee
*Director of the United States Patent and Trademark Office*